(12) United States Patent
Ishikawa et al.

(10) Patent No.: US 11,565,589 B2
(45) Date of Patent: Jan. 31, 2023

(54) TRAVELING VEHICLE AND WORKING VEHICLE

(71) Applicant: KUBOTA CORPORATION, Osaka (JP)

(72) Inventors: Shinnosuke Ishikawa, Sakai (JP); Susumu Umemoto, Sakai (JP); Ryo Kurata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 356 days.

(21) Appl. No.: 16/911,626

(22) Filed: Jun. 25, 2020

(65) Prior Publication Data

US 2021/0031624 A1 Feb. 4, 2021

(30) Foreign Application Priority Data

Jul. 30, 2019 (JP) .............................. JP2019-140203

(51) Int. Cl.
*B60K 31/00* (2006.01)
*A01F 15/08* (2006.01)
*A01F 15/07* (2006.01)

(52) U.S. Cl.
CPC .......... *B60K 31/0058* (2013.01); *A01F 15/08* (2013.01); *A01F 15/07* (2013.01); *B60Y 2200/221* (2013.01); *B60Y 2300/72* (2013.01)

(58) Field of Classification Search
CPC ...... A01F 15/07; A01F 15/08; A01F 15/0833; B60K 31/0058; B60Y 2200/221; B60Y 2300/72

See application file for complete search history.

(56) References Cited

U.S. PATENT DOCUMENTS

| 7,404,355 | B2 | 7/2008 | Viaud et al. |
| 7,937,923 | B2* | 5/2011 | Biziorek ............. A01F 15/0715 56/343 |
| 9,008,920 | B1* | 4/2015 | Smith .................... A01F 15/08 56/10.2 G |
| 9,526,212 | B2* | 12/2016 | Smith .................... A01F 15/07 |
| 2006/0048481 | A1* | 3/2006 | Hood .................. A01F 15/0715 53/399 |
| 2007/0175198 | A1* | 8/2007 | Viaud ................. A01F 15/0883 56/341 |
| 2009/0107102 | A1* | 4/2009 | Biziorek ............. A01F 15/0883 56/341 |
| 2011/0112729 | A1* | 5/2011 | Martin .................... A01F 15/08 701/50 |

(Continued)

FOREIGN PATENT DOCUMENTS

EP 2 052 598 A1 4/2009
EP 2 745 674 A1 6/2014

(Continued)

OTHER PUBLICATIONS

Official Communication issued in corresponding European Patent Application No. 20180730.2, dated Dec. 4, 2020.

*Primary Examiner* — Tyler J Lee
(74) *Attorney, Agent, or Firm* — Keating and Bennett, LLP

(57) ABSTRACT

A tractor includes a controller configured to make a determination as to whether stopping control is necessary and to start the stopping control, based on a relation between a target bale size and a current bale size and a stopping distance corresponding to a vehicle speed and a surrounding environment.

8 Claims, 4 Drawing Sheets

(56) References Cited

U.S. PATENT DOCUMENTS

| | | | |
|---|---|---|---|
| 2011/0238269 A1* | 9/2011 | Martin | A01F 15/08 701/50 |
| 2013/0116895 A1* | 5/2013 | Smith | A01F 15/08 701/50 |
| 2016/0143225 A1* | 5/2016 | Smith | A01F 15/141 701/50 |
| 2016/0374271 A1* | 12/2016 | Menetrier | B65B 35/22 53/167 |
| 2018/0368330 A1 | 12/2018 | Kurata et al. | |
| 2021/0022296 A1* | 1/2021 | Miwa | A01D 69/03 |

FOREIGN PATENT DOCUMENTS

| | | |
|---|---|---|
| JP | 2006-200575 A | 8/2006 |
| JP | 2007-135502 A | 6/2007 |
| JP | 2010-262403 A | 11/2010 |
| JP | 2018-082630 A | 5/2018 |
| JP | 2019-004730 A | 1/2019 |

* cited by examiner

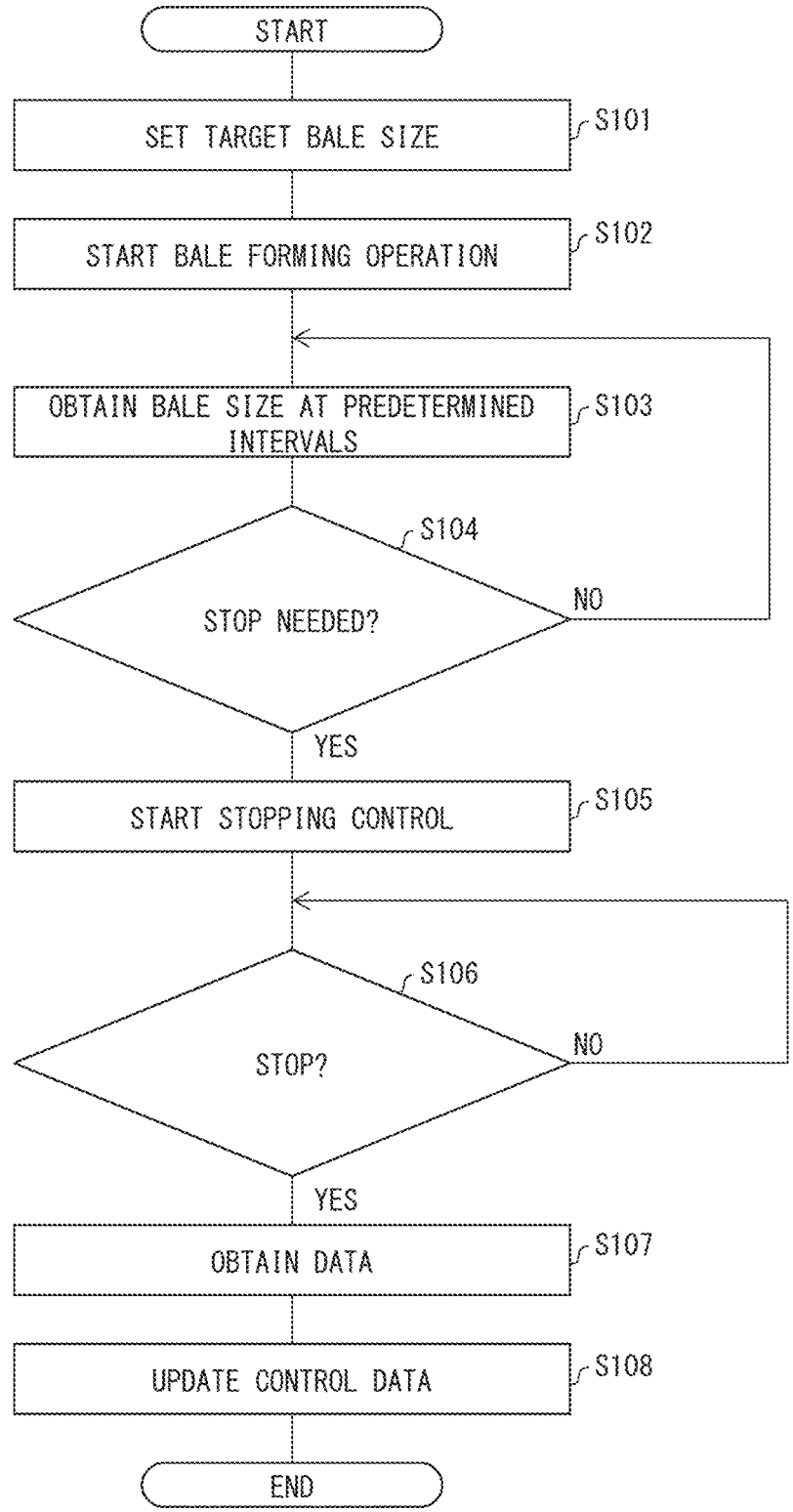

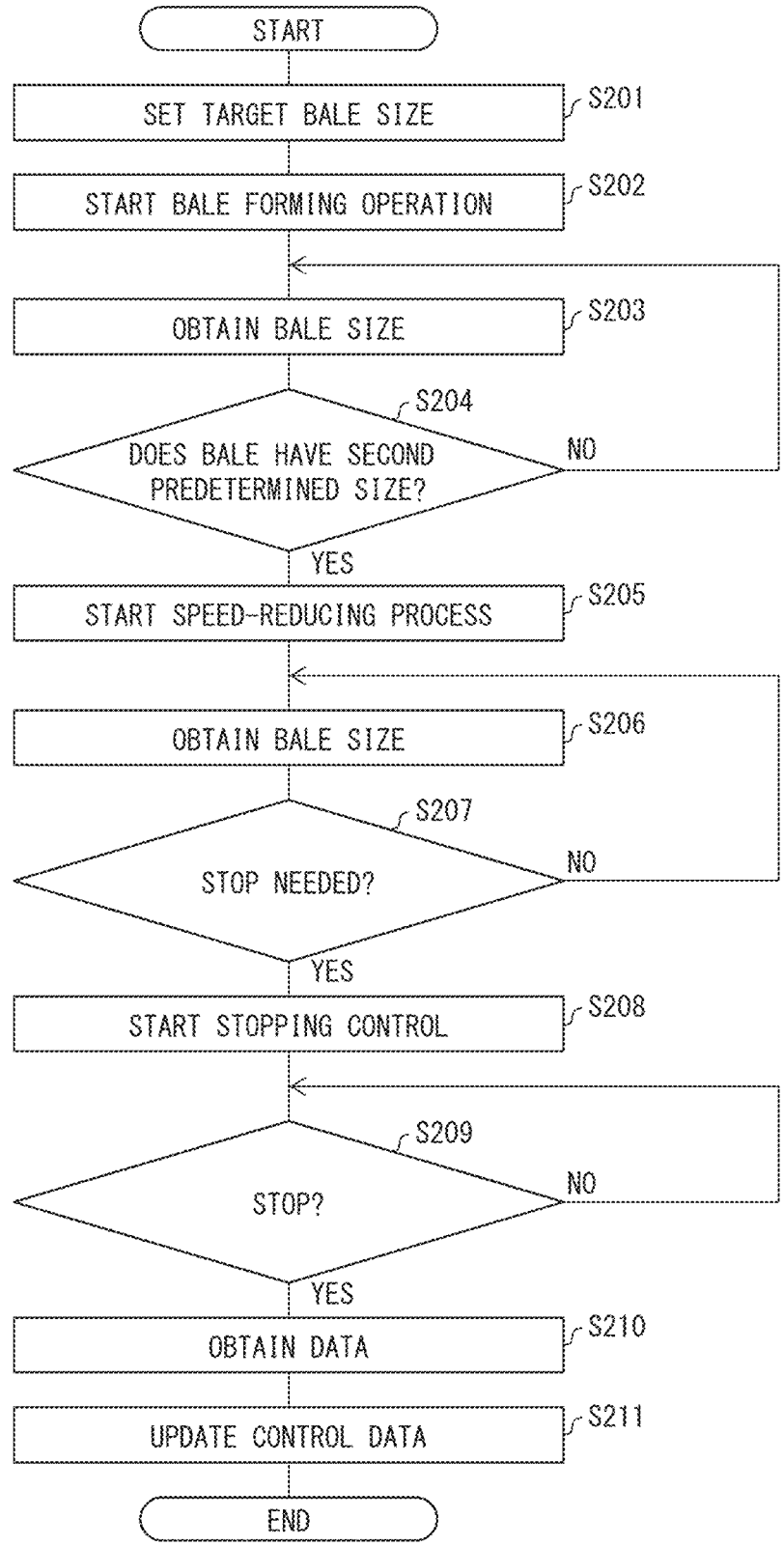

TRAVELING VEHICLE AND WORKING VEHICLE

CROSS REFERENCE TO RELATED APPLICATIONS

This application claims the benefit of priority under 35 U.S.C. § 119 to Japanese Patent Application No. 2019-140203 filed on Jul. 30, 2019, the entire contents of which application are hereby incorporated herein by reference.

BACKGROUND OF THE INVENTION

1. Field of the Invention

The present invention relates to a traveling vehicle, such as a tractor to which a baler serving as a working machine is attached, and a working vehicle including the traveling vehicle and the working machine.

2. Description of the Related Art

A working machine called a baler is used to collect, compress, and wrap mowed pasture grass and hay so as to produce bales. Balers are often towed by a traveling vehicle such as a tractor.

U.S. Pat. No. 7,404,355 discloses that when a bale becomes a predetermined size, a baler sends a stopping signal to a tractor and stops the tractor.

SUMMARY OF THE INVENTION

It is required that bales be uniform. However, the above-described conventional technique has a problem in that shaped bales vary in size since variation occurs in a length of time which elapses after the baler sends a stopping signal to the tractor until the tractor actually stops, depending on weather such as rain, an inclination of an agricultural field, and the like.

Preferred embodiments of the present invention provide working vehicles each including a traveling vehicle and a working machine and making shaped bales uniformly sized.

A traveling vehicle in accordance with an aspect of a preferred embodiment of the present invention is a traveling vehicle to which a baler is attached, the traveling vehicle including: a communicator configured to receive, from the baler, information on a size of a bale produced by the baler; and a controller configured to carry out stopping control of the traveling vehicle when the bale becomes a first size, the stopping control being based on a stopping distance corresponding to (i) a vehicle speed of the traveling vehicle and (ii) a surrounding environment, the first size allowing the bale to have a target size when the traveling vehicle stops.

According to the above configuration, the stopping control of the traveling vehicle is carried out based on the stopping distance corresponding to (i) a vehicle speed of the traveling vehicle and (ii) a surrounding environment, at a time point at which the bale becomes a first size which allows the bale to have the target size when the traveling vehicle stops. This allows the bale to have a size equal to or almost equal to the target size.

A traveling vehicle in accordance with an aspect of a preferred embodiment of the present invention can also be configured such that the controller determines the stopping distance with use of a learning process of the surrounding environment of the traveling vehicle, when the stopping control is to be carried out.

According to the above configuration, it is possible determine a stopping distance suitable for an actual surrounding environment, by use of the learning process of the surrounding environment.

A traveling vehicle in accordance with an aspect of a preferred embodiment of the present invention can also be configured such that the controller takes into consideration, in next stopping control, a difference between the target size and the size of the bale at a time when the traveling vehicle stops.

According to the above configuration, it is possible to make the size of the bale closer to the target size in next stopping control, since the difference between the target size and the size of the bale at the time when the traveling vehicle stops will be taken into consideration in the next stopping control.

A traveling vehicle in accordance with an aspect of a preferred embodiment of the present invention can also be configured such that the controller carries out a speed-reducing process, at a time point when the bale becomes a second size smaller than the target size.

According to the above configuration, it is possible to more precisely control a distance which the traveling vehicle takes to stop.

A traveling vehicle in accordance with an aspect of a preferred embodiment of the present invention can also be configured such that the controller places a transmission in neutral, in the speed-reducing process.

According to the above configuration, the transmission is placed in neutral in the speed-reducing process, so that it is possible to easily and reliably carry out the stopping control which will be subsequently carried out.

A working vehicle in accordance with an aspect of a preferred embodiment of the present invention is a working vehicle including: a traveling vehicle; and a working machine, the traveling vehicle including a vehicle body, a driver, a controller, and a communicator, the working machine including: a baler configured to form a bale; a sensor configured to measure a size of the bale; a baler controller configured to carry out control to form the bale; and a baler communicator configured to carry out interactive communication with the traveling vehicle, the controller of the traveling vehicle being configured to (i) receive the size of the bale measured by the sensor in the working machine, via the baler communicator and the communicator of the traveling vehicle, (ii) compare the size of the bale with a target size, and (iii) carry out stopping control of the traveling vehicle when the bale becomes a first size, the stopping control being based on a stopping distance corresponding to (i) a vehicle speed of the traveling vehicle and (ii) a surrounding environment, the first size allowing the bale to have a target size when the traveling vehicle stops.

According to the above configuration, the stopping control of the traveling vehicle is carried out based on the stopping distance corresponding to (i) a vehicle speed of the traveling vehicle and (ii) a surrounding environment, at a time point at which the bale becomes a first size which allows the bale to have the target size when the traveling vehicle stops. This allows the bale to have a size equal to or almost equal to the target size.

A working vehicle in accordance with an aspect of a preferred embodiment of the present invention can also be configured such that the controller determines the stopping distance with use of a learning process of the surrounding environment of the traveling vehicle, when the stopping control is to be carried out.

According to the above configuration, it is possible determine a stopping distance suitable for an actual surrounding environment, by use of the learning process of the surrounding environment.

A working vehicle in accordance with an aspect of a preferred embodiment of the present invention can also be configured such that the controller takes into consideration, in next stopping control, a difference between the target size and the size of the bale at a time when the traveling vehicle stops.

According to the above configuration, it is possible to make the size of the bale closer to the target size in next stopping control, since the difference between the target size and the size of the bale at the time when the traveling vehicle stops will be taken into consideration in the next stopping control.

A working vehicle in accordance with an aspect of a preferred embodiment of the present invention can also be configured such that the controller carries out a speed-reducing process, at a time point when the bale becomes a second size smaller than the target size.

According to the above configuration, it is possible to more precisely control a distance which the traveling vehicle takes to stop.

A working vehicle in accordance with an aspect of a preferred embodiment of the present invention can also be configured such that the controller places a transmission in neutral, in the speed-reducing process.

According to the above configuration, the transmission is placed in neutral in the speed-reducing process, so that it is possible to easily and reliably carry out the stopping control which will be subsequently carried out.

A working vehicle in accordance with an aspect of a preferred embodiment of the present invention makes it possible to make shaped bales uniformly sized.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a flowchart showing a flow of a process in a preferred embodiment of the present invention.

FIG. 4 is a flowchart showing a flow of a process in another preferred embodiment of the present invention.

DETAILED DESCRIPTION OF THE PREFERRED EMBODIMENTS

Preferred Embodiment 1

The following will discuss in detail a preferred embodiment of the present invention. In Preferred Embodiment 1, the following example explanation deals with a working vehicle 30 which uses a tractor 10 as a traveling vehicle and a baler 20 as a working machine, as illustrated in FIG. 1.

Figure 1:
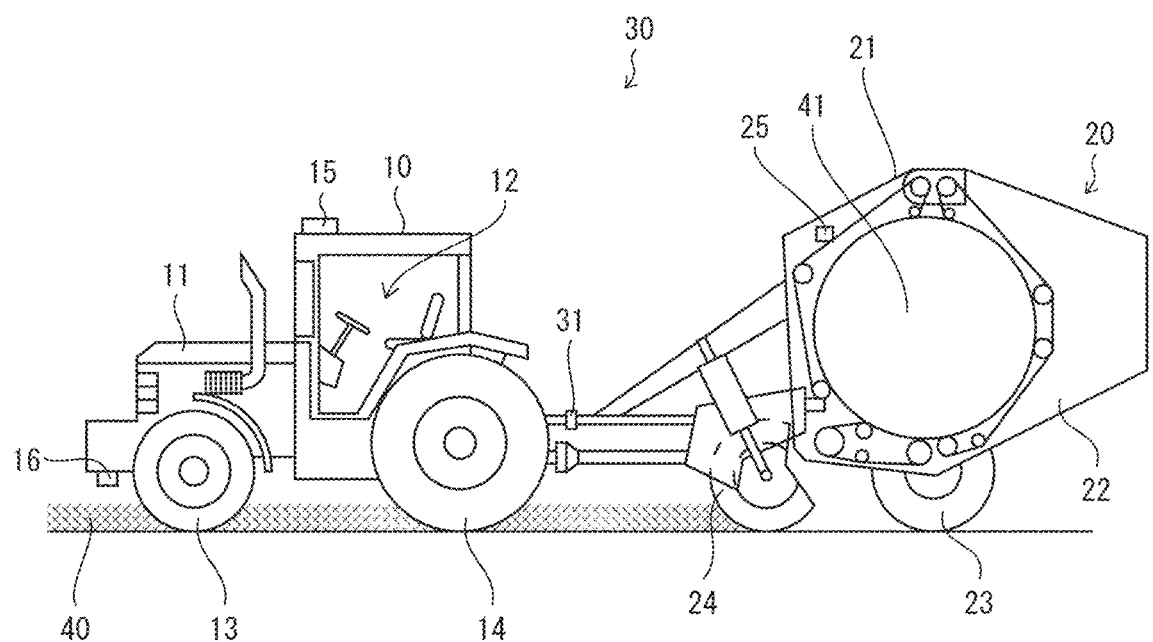
FIG. 1 is a side view of a tractor and a baler in accordance with a preferred embodiment of the present invention.

The following will discuss the tractor 10 serving as an example of the traveling vehicle, with reference to FIG. 1. FIG. 1 is a side view of the tractor 10 and the baler 20. The tractor 10 includes a vehicle body 11, a cabin 12 included in the vehicle body 11, and a front wheel 13 and a rear wheel 14 which are used for traveling by power from an engine or a motor (which are not illustrated). Further, the tractor 10 can reduce its speed or stop by using a brake (not illustrated).

The tractor 10 also includes a GPS section 15, and can obtain position information from a satellite. Use of the position information allows for automatic steering of the tractor 10. It is also possible that the tractor 10 is configured to automatically travel on a swath 40. The GPS section 15 can include an inertial measurement unit (IMU). The inertial measurement unit can complement the accuracy of the position information of a GPS. Further, since the inertial measurement unit makes it possible to measure respective angles of three axes, it is possible to measure a vehicle posture of the tractor 10, for example, on uneven ground and/or sloped ground of an agricultural field. Further, the tractor 10 also can include a measuring sensor 16 such as a light detection and ranging (Lidar) or a camera. The tractor 10 can detect the swath 40 by the measuring sensor 16 and automatically travel on the swath 40.

Figure 2:
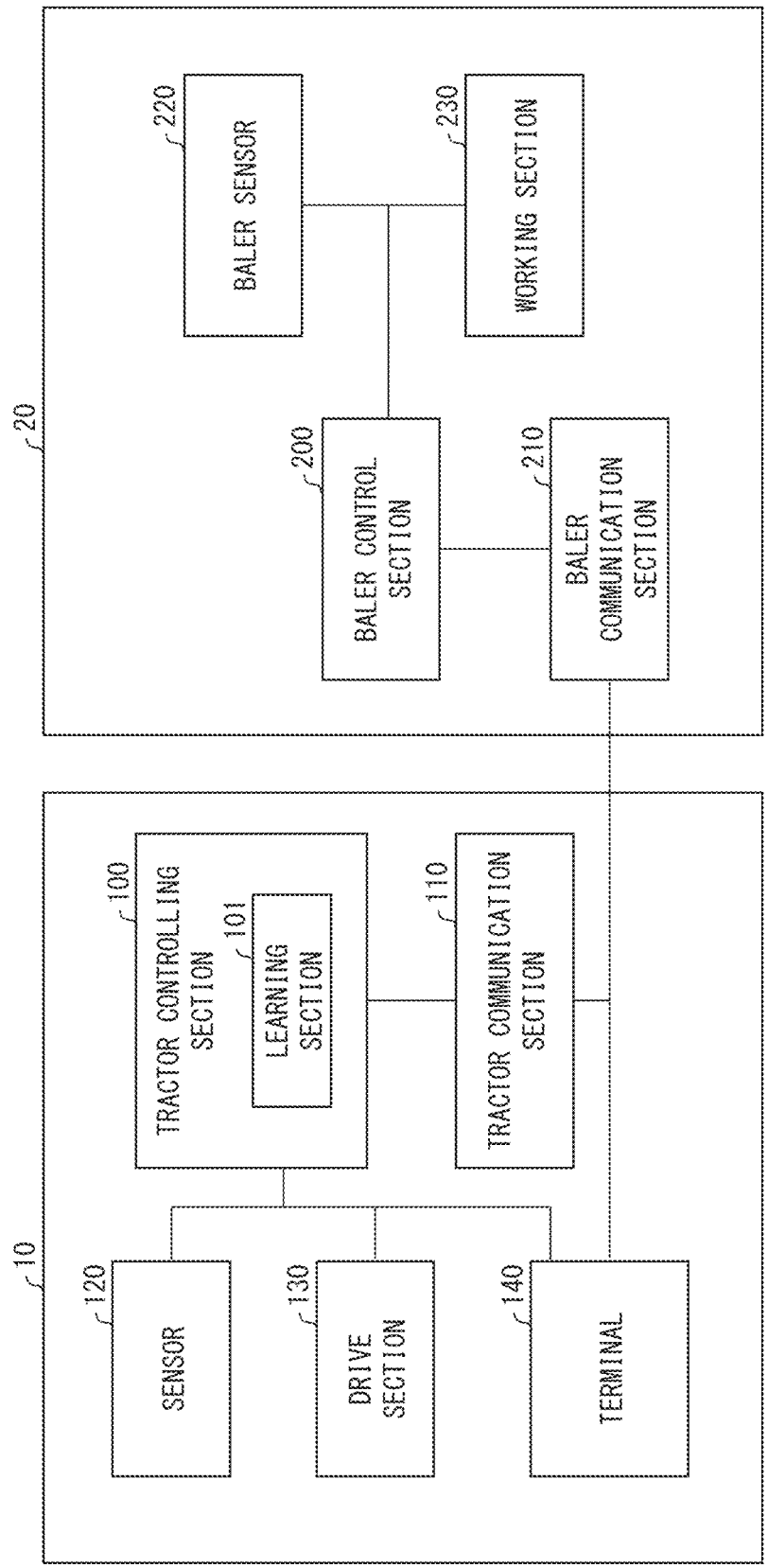
FIG. 2 is a functional block diagram of a tractor and a baler in accordance with a preferred embodiment of the present invention.

Next, the following will discuss control of the tractor 10, with reference to FIG. 2. FIG. 2 is a functional block diagram of the tractor 10 and the baler 20. As illustrated in FIG. 2, the tractor 10 includes a tractor controlling section (controller) 100, a tractor communication section (communicator) 110, a sensor 120, a drive section 130, and a terminal 140. These are connected to each other in conformity to international standard ISO 11783 for a network system based on a control area network (CAN), which is called ISOBUS.

The tractor controlling section 100 includes an electronic control unit (ECU), and typically includes a control processing unit (CPU), a memory, control software, and/or the like. The tractor controlling section 100 carries out control associated with traveling of the tractor 10 such as running and stopping of the tractor 10, control on a power take-off (PTO) which transmits power from an engine to the working machine, and control on a hitch for attachment of the working machine.

The tractor controlling section 100 includes a learning section 101. The learning section 101 performs machine learning by deep learning which is one kind of artificial intelligence (AI) so that a bale 41 formed by the baler 20 (described later) has a target size at the time when the tractor 10 stops.

The sensor 120 includes sensors related to a basic operation of the tractor 10, such as sensors for a vehicle speed, a transmission, an engine revolution speed, a PTO revolution speed, attachment of the working machine, and an oil pressure, and in addition, the GPS 15, the inertial measurement unit, and the measuring sensor 16 which are described above. Information obtained by these sensors of the sensor 120 is sent to the tractor controlling section 100, and used for the control of the tractor 10.

The drive section 130 includes a power source such as the engine and the motor, the transmission, a clutch axle, the brake, the front wheel 13, the rear wheel 14, the PTO which drives the working machine, and the hitch. As the brake, an electric brake is used. These members of the drive section 130 are controlled by the tractor controlling section 100.

The terminal 140 includes a display section and an operation receiving section (which are not illustrated). The terminal 140 is used not only to display information obtained from sensors of the tractor 10 and the baler 20, but also to perform an operation related to an operation of the baler 20 and set the PTO and the hitch of the tractor 10.

The tractor communication section 110 carries out bidirectional communication (interactive communication) with the baler 20. Here, the tractor communication section 110 communicates in conformity with the international standard ISO 11783. Further, a tractor implement management (TIM) system is also mounted, so that the tractor communication section 110 receives a control signal from the baler 20. It is then possible to carry out control of speed of the tractor 10, control of the PTO revolution speed, control of height of the hitch, control of oil pressure, and/or the like. Note that the terminal 140 is connected with the baler 20 such that the tractor communication section 110 does not intervene between the terminal 140 and the baler 20. Furthermore, the terminal 140 is also connected with the tractor controlling section 100, etc.

The following will discuss the baler 20 which serves as an example of a working machine, with reference to back to FIG. 1. The baler 20 includes a frame 21, a rear gate 22, and a traveling wheel 23. The baler 20 is physically and electrically connected with the tractor 10 by a joint 31. The baler 20 is towed by the tractor 10, and forms a bale 41.

The baler 20 sends, into an inside of the baler 20 which is surrounded by the frame 21 and the rear gate 22, hay, straw, and/or the like, which are mowed pasture grass, wheat, and the like, in the swath 40, through an intake port 24. Then, the baler 20 forms the bale 41. The baler 20 is provided with a bale size sensor 25 in the inside which is surrounded by the frame 21 and the rear gate 22. The bale size sensor 25 detects a size of the bale 41. When the size of the bale 41 becomes a predetermined size, the tractor 10 stops. Then, the bale 41 is wrapped and ejected from the baler 20.

Next, the following will discuss control of the baler 20, with reference to FIG. 2. The baler 20 includes a baler control section 200, a baler communication section 210, a baler sensor 220, and a working section 230. These are connected via ISOBUS.

The baler control section 200 includes an electronic control unit (ECU), and typically includes a control processing unit (CPU), a memory, control software, and the like. The baler control section 200 carries out control necessary for forming a bale which has a predetermined size and a shape by compression of hay and/or straw.

The baler 20 includes mainly a baler called a round baler which forms cylinder-shaped bales 41, and a baler called a square baler which forms square bales 41. It is possible to express a shape of the bale 41 by length×width×height, where it is defined that (i) a length direction is a traveling direction of the baler 20, (ii) a width direction is a direction orthogonal to the traveling direction of the baler 20, and (iii) a height direction is a height direction of the baler 20. For example, a square bale 41 can have a size of 200 cm in length×80 cm in width×90 cm in height, and a round bale 41 can have a size of 120 cm in width and 150 cm in diameter (length and height). For example, in the case of the round baler, the size of the bale 41 is increased such that the size is even in the width direction, by evenly distributing hay and/or straw in the width direction. Then, when the bale 41 becomes a target size (with regard to diameter), the baler 20 stops working.

Further, the baler control section 200 sends, to the tractor 10 via the baler communication section 210, necessary information including, for example, a current size and/or a shape of the bale 41, or if necessary, a speed control request for, for example, speed reduction. The information is displayed on the terminal 140 of the tractor 10. Meanwhile, the width of the bale 41 is in general unequal to a width of the swath 40. Even if the bale 41 and the swath 40 have the same width, it is less likely that the swath 40 is uniform in density in the width direction of the swath 40. The swath 40 is often in the form of mounds. In light of this, in a case where the bale 41 is uneven in the width direction (uneven in width), the baler control section 200 sends such information to the tractor 10 and the information is displayed on the terminal 140. Then, the tractor 10 is driven by an operator on the basis of the information so as to travel aside from the center of the swath 40 so that the bale 41 can be evenly formed. Alternatively, the operator can drive the tractor 10 in a zigzag manner with respect to the center of the swath 40 so that the bale 41 can be evenly formed. As another alternative, it is possible to automatically drive the tractor 10 in a zigzag manner under control of the tractor controlling section 100.

The baler sensor 220 obtains, by measurement, information on the size, the shape, a weight, and a degree of evenness of a surface of the bale 41. The information obtained by the baler sensor 220 is sent to the baler control section 200 and used for control. In Preferred Embodiment 1, the size and the degree of evenness in the width direction of the bale 41 are measured by using, as the baler sensor 220, a plurality of bale size sensors 25 which are placed along the width direction.

The working section 230 produces the bale 41. As described above, the working section 230 forms the bale 41 by compressing and shaping the hay, straw, and/or the like which have been taken in through the intake port 24. Further, after the working section 230 produces the bale 41, the working section 230 wraps the bale 41 and ejects the bale 41 from the baler 20.

The baler communication section 210 carries out bidirectional communication in conformity with ISO 11783 with the tractor 10 and sends necessary information to the tractor 10. Further, the baler communication section 210 sends a request for, for example, speed control, as needed.

Next, the following will discuss a flow of a process in the tractor 10 and baler 20, with reference to FIG. 3. FIG. 3 is a flowchart showing the process in the tractor 10 and the baler 20.

As shown in FIG. 3, first, a target bale size (target size) is set (S101). The target bale size can be set in the tractor 10 or the baler 20. For example, an operator inputs the target bale size via the terminal 140 in the cabin 12 of the tractor 10. Then, data of the target bale size thus inputted is stored in a memory inside the tractor controlling section 100, and at the same time, the data of the target bale size is sent to the baler control section 200 via the baler communication section 210. The data thus sent is stored in a memory of the baler control section 200.

After the target bale size has been set, the tractor 10 and the baler 20 start a baling operation (S102). Then, the tractor 10 obtains a bale size from the baler 20 at predetermined intervals (S103). The predetermined intervals are each, for example, one second.

Then, the tractor controlling section 100 of the tractor 10 determines whether or not it is necessary to stop the tractor 10, by using, for example, data of the bale size thus obtained, a current speed of the tractor 10, an inclination of the agricultural field measured by the inertial measurement unit, a condition regarding whether the tractor 10 is ascending or descending, and a stopping distance (S104). Note that this stop determination step will be described in detail later. Subsequently, when a bale becomes the predetermined size, the tractor controlling section 100 determines that it is necessary to stop the tractor 10 (YES at S104). Then, the tractor controlling section 100 starts stopping control (S105).

Thereafter, when the tractor 10 actually stops (YES at S106), the tractor controlling section 100 obtains a distance by which the tractor 10 moved from the start of the stopping control until actual stop of the tractor 10, the bale size at the point of the actual stop, the vehicle speed of the tractor at the start of the stopping control, conditions of a surrounding environment, and the like (S107). At the end, the tractor 10 performs learning and updates the data of the tractor controlling section 100 (S108).

The above is the flow of the process in the tractor 10 and the baler 20.

Again with reference to FIGS. 1 and 2, the following will discuss stop determination control. As described above, the working vehicle 30 including the tractor 10 and the baler 20 travels on the swath 40 where pasture grass, wheat, etc. are mowed and collected on a thin path, and forms the bale 41. When the bale 41 becomes a predetermined size, the tractor 10 stops and then working vehicle 30 wraps the bale 41 and ejects the bale 41 from the baler 20.

In Preferred Embodiment 1, in order that at the time point at which the tractor 10 stops and the baling operation completes, the bale size may become the target bale size set in advance, the tractor 10 carries out a process of stopping the tractor 10 by using (i) the size of the bale 41 periodically transmitted (for example, every second) from the baler 20 and (ii) control data which has been generated from past data from the start of the stopping control of the tractor 10 to the actual stop of the tractor 10. Then, the tractor 10 performs learning by a neural network and deep learning, with use of various kinds of data associated with the process of stopping.

The bale 14 ultimately formed can have the target size, by taking into consideration (i) a difference between the current size of the bale 41 and the target bale size and (ii) a moving distance from the start of the stopping control.

Since the tractor controlling section 100 receives the vehicle speed from the sensor 120, the tractor controlling section 100 can calculate the stopping distance at a certain vehicle speed for a time period from breaking to stopping. The stopping distance varies depending on, for example, (i) conditions of a surrounding environment, such as whether the agricultural field is dry or muddy because of rain or the like, a property of soil of the agricultural field, a state of pasture grass on the agricultural field, an inclination of the agricultural field, and/or whether the tractor 10 is ascending or descending on a slope of the agricultural field and (ii) conditions of the working vehicle 30 such as a change in weight of the tractor 10 due to a decrease in fuel, a weight of the baler 20, and/or a size (weight) of the bale 41. In particular, in a case where the tractor 10 travels on mowed pasture grass in the agricultural field, the stopping distance largely varies if the pasture grass is slippery. In light of this, it is desirable to receive, from the baler control section 200, for example, data from a moisture sensor which is mounted on the baler 41 and to use the data as training data. Note that weather information may be inputted by an operator via the terminal 140, and used as moisture data.

Further, it is possible to record information on inclinations and recessions of the agricultural field by using a map and the GPS section 15 which includes the inertial measurement unit, when the tractor 10 performs other works such as mowing pasture grass, and to use such information as the training data. Data regarding the inclinations of the agricultural field can be managed, for example, as area information per 10 m$^2$. Meanwhile, data regarding the property of soil, and moisture can be managed for each agricultural field. This allows for quick calculation since an amount of information is reduced.

The learning section 101 (i) obtains the conditions of the surrounding environment of the agricultural field etc. and the conditions of the tractor 10, the baler 20, and/or the like through input of a sensor or an operator, and (ii) uses those conditions in an input layer in a neural network and deep learning. Further, the learning section 100 performs weighting based on past data, predicts the stopping distance, and uses the stopping distance for the stopping control carried out by the tractor controlling section 100.

It is possible to use, for example, (i) a method in which the stopping distance is predicted by (a) recording a stopping distance on a certain working day in a memory inside the tractor controlling section 100 and (b) taking into consideration the stopping distance on the certain working day or learning the stopping distance on the certain working day, or (ii) a method in which weighting is performed by using a past stopping distance(s) in addition to the stopping distance on that certain working day. In this case, it is possible to use deep learning in which (i) the past stopping distance is used in a first layer of an intermediate layer, (ii) data of the stopping distance on that certain working day in a second layer of the intermediate layer, and (iii) a weight is given more heavily to the second layer. Although the stopping distance can be obtained by calculation, it is alternatively possible to store data of the stopping distance in the learning section 101 and use the data. Further, the stopping distance can be managed for each agricultural field.

The tractor controlling section 100 measures a difference and a rate between (a) the current size of the bale 41, which is transmitted from the baler 20, and (b) the target bale size (for example, a size of 120 cm in width×150 cm in diameter) and display the difference and the rate on the terminal 140. The tractor controlling section 100 measures the difference between the current size of the bale 41 and the target bale size, and carries out the stopping control based on the stopping distance of the tractor 10, which is predicted by the learning section 101, at a time point at which the bale 41 has a size that will consequently become the target size when the tractor 10 stops (the bale size at this time point is referred to as a predetermined bale size (first size)). Further, the learning section 101 can more accurately calculate the time point at which the bale 41 becomes the predetermined bale size, by measuring a change over time of the size of the bale 41, which is transmitted from the baler 20, together with the difference and the rate described above.

The learning section 101 can measure a density of the swath 40 by using one measuring sensor 16 of the sensor 120 and use the density for predicting the time point at which the bale 41 becomes the predetermined size. This makes it possible to more accurately predict the time point at which the bale 41 becomes the predetermined bale size.

The tractor controlling section 100 can measure the latest size of the bale 41, which has been regularly updated by the baler 20, when the tractor 10 is stopped. This allows the tractor controlling section 100 to improve accuracy by taking into consideration the different or the ratio between the latest size and the target bale size at the time when the tractor 10 is to be stopped next.

In a tractor implement management (TIM) system, it is possible for the baler 20, which is the working machine, to carry out speed control of the tractor 10 and stop the tractor 10. Accordingly, it is also possible for the baler 20 to send a stopping signal when the bale 41 becomes the predetermined size, and the tractor 10 stops on receipt of the stopping signal. However, in such a system, the size of the bale 41 varies since it is difficult for the baler 20 to take into consideration different stopping distances which occur due to (i) difference in braking distance between different types of tractors and (ii) difference between surrounding environments.

However, it is possible to make the size of the bale more accurately uniform by a configuration in which the controlling section 100 receives the size of the bale 41 from the baler 20 and controls the tractor 10 in accordance with the stopping distance which is predicted.

Preferred Embodiment 2

In Preferred Embodiment 2, stopping control is carried out after a speed-reducing process is carried out. The following will discuss a flow of a process in a tractor 10 and a baler 20, with reference to FIG. 4. FIG. 4 is a flowchart showing the flow of the process in the tractor 10 and baler 20.

As shown in FIG. 4, a target bale size is set (S201). The target bale size can be set by the tractor 10 or the baler 20. For example, an operator inputs the target bale size via a terminal 14 of the tractor 100. Then, data of the target bale size thus inputted is sent to a baler control section 200 via a baler communication section 210.

After the target bale size has been set, the tractor 10 and the baler 20 start a baling operation (S202). Then, the tractor 10 obtains a bale size from the baler 20 at predetermined intervals (S203). The predetermined intervals can be each, for example, 5 seconds.

The baler control section 200 transmits a speed-reducing request to the tractor 10 when a bale 41 becomes a second predetermined size (second size of bale) (YES at S204). The second predetermined size of the bale 41 is smaller than a predetermined size that is a target size. For example, the second predetermined size is 95% of the target size. Receiving the speed-reducing request, the tractor 10 carries out the speed-reducing process (S205). Note that although in Preferred Embodiment 2, the baler control section 200 determines whether the size of the bale 41 is the second predetermined size, the tractor controlling section 100, instead of the baler control section 200, can carry out this determination. In the speed-reducing process, the tractor controlling section 100 reduces a vehicle speed of 12 km/h in working prior to speed reduction to 8 km/h, for example. This speed reduction is carried out by controlling a transmission.

The tractor 10 obtains the bale size from the baler 20 at predetermined intervals (S206). The predetermined intervals are each, for example, one second. It is possible to reduce load to a system by changing a length of transmission intervals of the bale size in this way.

Then, the tractor controlling section 100 of the tractor 10 determines whether or not it is necessary to stop the tractor 10, by using, for example, data of the bale size obtained, a current speed of the tractor 10, an inclination of an agricultural field measured by an inertial measurement unit, a condition regarding whether the tractor 10 is ascending or descending, and a stopping distance (S207). Subsequently, when the bale 41 becomes the predetermined size and it is determined that the tractor 10 needs to be stopped (YES at S207), the tractor controlling section 100 starts the stopping control (S208).

Thereafter, when the tractor 10 actually stops (YES at S209), the tractor controlling section 100 obtains a distance by which the tractor 10 moved from the start of the stopping control until actual stop of the tractor 10, the bale size at the point of the actual stop, the vehicle speed of the tractor at the start of the stopping control, conditions of a surrounding environment, and the like (S210). At the end, the tractor 10 performs learning and updates the data of the tractor controlling section 100 (S211).

The above is the flow of the process in the tractor 10 and the baler 20 in Preferred Embodiment 2.

In a case where the above-described control is carried out, the stopping control can be more reliably carried out since the tractor 10 is already in a state in which the vehicle speed is reduced. This makes it possible to make the size of the bale 41 accurately uniform.

The tractor controlling section 100 carries out the above-described speed-reducing process by controlling the transmission. Alternatively, the tractor controlling section 100 can carry out the speed-reducing process by switching off the clutch. In other words, the vehicle speed can be reduced by switching off the clutch and placing the transmission in neutral. In this case, the tractor 10 continues traveling through inertia, and the vehicle speed of the tractor 10 is gradually reduced. Whereas the second predetermined size is 95% of the target size in the above-described example, the second predetermined size can be 98% of the target size, for example, in a case where such a neutral process is carried out. Thereafter, the stopping control is started and the tractor 10 is stopped, by turning on an electric brake. The tractor 10 may naturally stop without use of the electric brake, depending on a range of speed which is to be reduced after the neutral process. In this case, it is possible to consider the speed-reducing process without use of the electric brake. Therefore, learning of speed reduction after the neutral process should be also carried out.

In a case where the above-described control is carried out, the stopping control can be more reliably carried out since the tractor 10 is already in a neutral state. This makes it possible to make the size of the bale 41 accurately uniform.

The tractor controlling section 100 of the tractor 10 can be realized by a logic circuit (hardware) provided in an integrated circuit (IC chip) or the like or can be alternatively realized by software.

In the latter case, the tractor 10 includes a computer that executes instructions of a program that is software realizing the foregoing functions. The computer, for example, includes at least one processor (control device) and at least one computer-readable storage medium storing the program. A preferred embodiment of the present invention may include a configuration in which the processor of the computer reads and executes the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of a preferred embodiment of the present invention can also be achieved in the form of a computer data signal in which the program is embodied via electronic transmission and which is embedded in a carrier wave.

The present invention is not limited to the preferred embodiments, but can be altered by a skilled person in the art within the scope of the claims. The present invention also encompasses, in its technical scope, any preferred embodiment derived by combining technical features or aspects disclosed in differing preferred embodiments. Further, it is possible to form a new technical feature by combining the technical features or aspects disclosed in the respective preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle to which a baler is attached, the traveling vehicle comprising:
a communicator configured to receive, from the baler, information on a size of a bale produced by the baler; and
a controller configured to carry out stopping control of the traveling vehicle when the bale becomes a first size, the stopping control being based on a stopping distance corresponding to (i) a vehicle speed of the traveling vehicle and (ii) a surrounding environment, the first size allowing the bale to have a target size when the traveling vehicle stops; wherein
the controller is configured to determines the stopping distance with use of a learning process of the surrounding environment of the traveling vehicle, when the stopping control is to be carried out.

2. The traveling vehicle as set forth in claim 1, wherein:
the controller is configured to carry out a speed-reducing process, at a time point when the bale becomes a second size smaller than the target size.

3. The traveling vehicle as set forth in claim 2, wherein:
the controller is configured to places a transmission in neutral, in the speed-reducing process.

4. A traveling vehicle to which a baler is attached, the traveling vehicle comprising:
a communicator configured to receive, from the baler, information on a size of a bale produced by the baler; and
a controller configured to carry out stopping control of the traveling vehicle when the bale becomes a first size, the stopping control being based on a stopping distance corresponding to (i) a vehicle speed of the traveling vehicle and (ii) a surrounding environment, the first size allowing the bale to have a target size when the traveling vehicle stops; wherein
the controller is configured to takes into consideration, in a next stopping control, a difference between the target size and the size of the bale at a time when the traveling vehicle stops.

5. A working vehicle comprising:
a traveling vehicle; and
a working machine; wherein
the traveling vehicle includes a vehicle body, a drive section, a controller, and a communicator;
the working machine includes:
a baler configured to form a bale;
a sensor configured to measure a size of the bale;
a baler controller configured to carry out control for forming the bale; and
a baler communicator configured to carry out interactive communication with the traveling vehicle;
the controller of the traveling vehicle is configured to (i) receive the size of the bale measured by the sensor in the working machine, via the baler communicator and the communicator of the traveling vehicle, (ii) compare the size of the bale with a target size, and (iii) carry out stopping control of the traveling vehicle when the bale becomes a first size, the stopping control being based on a stopping distance corresponding to (i) a vehicle speed of the traveling vehicle and (ii) a surrounding environment, the first size allowing the bale to have a target size when the traveling vehicle stops; and
the controller is configured to determine the stopping distance with use of a learning process of the surrounding environment of the traveling vehicle, when the stopping control is to be carried out.

6. The working vehicle as set forth in claim 5, wherein:
the controller is configured to takes into consideration, in a next stopping control, a difference between the target size and the size of the bale at a time when the traveling vehicle stops.

7. The working vehicle as set forth in claim 5, wherein:
the controller is configured to carry out a speed-reducing process, at a time point when the bale becomes a second size smaller than the target size.

8. The working vehicle as set forth in claim 7, wherein:
the controller is configured to places a transmission in neutral, in the speed-reducing process.

* * * * *